US007852805B2

(12) United States Patent
Kahtava et al.

(10) Patent No.: US 7,852,805 B2
(45) Date of Patent: Dec. 14, 2010

(54) VARIABLE LENGTH RADIO LINK ID FOR RESOURCE ALLOCATION IN MOBILE COMMUNICATION SYSTEMS

(76) Inventors: Jussi T. Kahtava, Monreve Kichijoji #103, Shimo-renjaku 8-7-5, Mitaka-Shi, Tokyo-to, 181-0013 (JP); Tsuyoshi Kashima, 645-40, Daimura-cho, Midori-ku, Yokohama, Kanagawa, 226-0014 (JP)

( * ) Notice: Subject to any disclaimer, the term of this patent is extended or adjusted under 35 U.S.C. 154(b) by 938 days.

(21) Appl. No.: 11/590,688

(22) Filed: Oct. 30, 2006

(65) Prior Publication Data

US 2007/0097866 A1 May 3, 2007

Related U.S. Application Data

(60) Provisional application No. 60/732,693, filed on Nov. 1, 2005.

(51) Int. Cl.
 *H04W 4/00* (2009.01)
(52) U.S. Cl. .................. 370/329; 370/341; 370/343; 455/415
(58) Field of Classification Search ............. 370/329, 370/341, 343; 455/415
See application file for complete search history.

(56) References Cited

U.S. PATENT DOCUMENTS

| 5,491,692 | A * | 2/1996 | Gunner et al. ............. 370/402 |
| 5,812,951 | A * | 9/1998 | Ganesan et al. ........... 455/445 |
| 6,725,039 | B1 * | 4/2004 | Parmar et al. ............. 455/436 |
| 7,398,164 | B2 * | 7/2008 | Ogushi et al. .............. 702/42 |
| 7,411,918 | B2 * | 8/2008 | Zhang ...................... 370/252 |
| 2002/0163894 | A1 * | 11/2002 | Alapuranen et al. ....... 370/335 |
| 2003/0123413 | A1 * | 7/2003 | Moon et al. ............... 370/335 |
| 2003/0185193 | A1 * | 10/2003 | Choi et al. ................ 370/348 |
| 2003/0211846 | A1 * | 11/2003 | Nagpal et al. ............. 455/434 |
| 2004/0125776 | A1 * | 7/2004 | Haugli et al. ............. 370/338 |
| 2004/0131026 | A1 * | 7/2004 | Kim et al. ................ 370/328 |
| 2005/0136923 | A1 | 6/2005 | Alapuranen et al. |
| 2007/0015500 | A1 * | 1/2007 | Parmar et al. ............ 455/422.1 |
| 2007/0053320 | A1 * | 3/2007 | Rinne et al. .............. 370/329 |
| 2008/0165733 | A1 * | 7/2008 | Xiao et al. ............... 370/330 |
| 2008/0183767 | A1 * | 7/2008 | Zhu et al. ................ 707/200 |
| 2008/0186892 | A1 * | 8/2008 | Damnjanovic ............ 370/311 |

OTHER PUBLICATIONS

3GPP TS 25.214 V6.6.0, Technical Specification Group Radio Access Network; Physical layer procedures (FDD) (Release 6) (Jun. 2005).

3GPP TS 25.212 V6.5.0 Technical Specification Group Radio Access Network; Multiplexing and channel coding (FDD) (Release 6) (Jun. 2005).

(Continued)

*Primary Examiner*—Nghi H Ly
(74) *Attorney, Agent, or Firm*—Knobbe Martens Olson & Bear, LLP

(57) ABSTRACT

The specification and drawings present a new method, system, apparatus and software product for varying a length of a radio link ID (RLID) of a user equipment for resource allocation in mobile communication systems. This allows the system to employ shorter RLID lengths than is necessary if all user equipments (UEs) in the active mode are uniquely identified simultaneously, thus providing considerable savings in the signaling resource on the physical layer.

35 Claims, 3 Drawing Sheets

OTHER PUBLICATIONS

3GPP TS 25.331 V6.7.0 (Sep. 2005).

An Adaptive Interleaving Access Scheme (IAS) for IEEE 802.15.4 WPANs, Sheu Shiann-Tsong et al, Vehicular Technology Conference, 2005. VTC 2005-Spring.2005 IEEE 61$^{st}$ Stockholm, Sweden Apr. 30-May 1, 2005, Piscataway, NJ, USA, IEEE May 30, 2005, ISBN 0-7803-8887-9, p. 1523-1527 Section 1, abstract.

* cited by examiner

VARIABLE LENGTH RADIO LINK ID FOR RESOURCE ALLOCATION IN MOBILE COMMUNICATION SYSTEMS

PRIORITY AND CROSS-REFERENCE TO RELATED APPLICATION

This application claims priority from U.S. Provisional Application Ser. No. 60/732,693, filed on Nov. 1, 2005.

TECHNICAL FIELD

This invention generally relates to mobile communications and more specifically to variable length radio link ID (RLID) for resource allocation in mobile communication systems.

BACKGROUND ART

In evolved UTRAN (EUTRAN) or other future systems concept, all the traffic across the radio interface takes place on a packet switched basis, i.e., no fixed resource is allocated to any user. In order to provide flexibility and fast allocation of resources, the signalling information in physical layer (L1) has to inform when and where a given user is receiving data in a downlink (or alternatively transmitting information in an uplink).

A number of users registered to EUTRAN under a Node B control can be much larger than that for WCDMA (wideband code division multiple access) systems. This number may be several hundreds of users depending on the bandwidth employed (e.g., 200 active users up to 5 MHz band, and 400 active users for broader spectrum). All of these users need to have an identity assigned to them, i.e. a Radio Link ID or RLID (the term "RLID" can be interpreted broadly; other equivalent terms which may be used instead of RLID may include but are not limited to: a user equipment ID (UEID), a cell radio network temporary identifier (C-RNTI), etc.). Note that the ID for idle users is different from the RLID used for active users (i.e., in an active mode).

Allocations of shared channel resource are done for each L1 subframe. For each subframe, the RLID for each scheduled user, in addition to its transport format information and information indicating where in the subframe its data is located, are signaled. Now, with the number of users being remarkably large, the number of RLIDs needed to signal for one allocation can require significant resources from a total channel capacity. As the allocation information is secondary to the actual traffic being transmitted, the size of this allocation information should be minimized. However, due to the large number of the UEs (user equipments) in the system, the RLID basically has to be at least of the same size as currently in the WCDMA HSDPA (high speed downlink packet access), i.e., 16 bits, for it to be unique for each UE.

DISCLOSURE OF THE INVENTION

According to a first aspect of the invention, a method, comprises: entering an active mode by a user equipment and assigning a radio link ID for the user equipment; additionally assigning a short radio link ID for the user equipment, wherein the short radio link ID comprises a smaller number of digital bits than the radio link ID; and allocating resources related to the user equipment using the short radio link ID during the active mode.

According further to the first aspect of the invention, the additionally assigning may be performed using at least one of: a) a network element providing the short radio link ID to the user equipment, b) the user equipment, and c) a predetermined algorithm.

According further to the first aspect of the invention, before the additionally assigning, the method may comprise: determining if the user equipment transmits and receives transport blocks with a regularity corresponding to a predetermined criterion, wherein the additionally assigning is performed only if the predetermined criterion is met. Further, the determining may be performed by a network element or by the user equipment.

Still further according to the first aspect of the invention, after the additionally assigning, the method may comprise: further assigning, if the predetermined criterion is met, a pattern of subframes during which the short radio link ID is valid for the user equipment. Further, the allocating resources related to the user equipment may be performed using the short radio link ID in the pattern of subframes during which the short radio link ID is valid and using the radio link ID for subframes not included in the pattern of subframes. Further still, the further assigning may be performed using at least one of: a) a network element providing the short radio link ID to the user equipment; b) the user equipment, and c) a predetermined algorithm.

According further to the first aspect of the invention, the allocated resources related to the user equipment may be in an uplink, in a downlink or in combination thereof.

According still further to the first aspect of the invention, the network element may be a Node B or a radio network controller and the network element and the user equipment may be configured for wireless communications.

According to a second aspect of the invention, a computer program product comprising: a computer readable storage structure embodying computer program code thereon for execution by a computer processor with the computer program code, wherein the computer program code comprises instructions for performing the first aspect of the invention, indicated as being performed by any component or a combination of components of the user equipment or a network.

According to a third aspect of the invention, a user equipment, comprises: an allocation obtaining block, for determining allocated resources related to the user equipment in an active mode using a short radio link ID additionally assigned to the user equipment during the active mode, wherein the short radio link ID comprises a smaller number of digital bits than a radio link ID assigned to the user equipment when the user equipment entered the active mode.

Further according to the third aspect of the invention, the allocation obtaining block may be configured to additionally assign the short radio link ID.

Still further according to the third aspect of the invention, the short radio link ID may be additionally assigned using at least one of: a) the allocation obtaining block, b) a network element, and c) a predetermined algorithm.

According further to the third aspect of the invention, the user equipment may further comprise: a receiving/transmitting/processing module, responsive to a downlink signal, for providing an uplink signal; and an uplink/downlink activity block, responsive to the uplink and downlink signals, for determining if the user equipment transmits and receives transport blocks with a regularity corresponding to a predetermined criterion, wherein the additionally assigning of the short radio link ID is performed if it is determined that the user equipment transmits and receives transport blocks with the regularity corresponding to the predetermined criterion.

According still further to the third aspect of the invention, the user equipment may further comprise: un uplink scheduling and signal generating module, for scheduling and providing an uplink signal to a network element using the allocated resources According yet further still to the third aspect of the invention, the allocation obtaining block may be configured for the determining the allocated resources related to the user equipment using the short radio link ID in a pattern of subframes during which the short radio link ID is valid and using the radio link ID for subframes not included in the pattern of subframes, wherein the pattern of subframes during which the short radio link ID is valid for the user equipment is further assigned to the user equipment. Further, the allocation obtaining block may be configured to further assign the short radio link ID. Further still, the short radio link ID may be further assigned using at least one of: a) the allocation obtaining block, b) a network element, and c) a predetermined algorithm.

According further still to the third aspect of the invention, the allocated resources related to the user equipment may be in an uplink, in a downlink or in combination thereof.

Yet still further according to the third aspect of the invention, an integrated circuit may comprise all or selected blocks or modules of the user equipment.

According to a fourth aspect of the invention, a mobile communication system, comprises: a network element, for providing a downlink signal; and a user equipment, responsive to the downlink signal, for allocating resources related to the user equipment in an active mode using a short radio link ID additionally assigned for the user equipment during the active mode, wherein the short radio link ID comprises a smaller number of digital bits than a radio link ID assigned to the user equipment when the user equipment entered the active mode.

According further to the fourth aspect of the invention, the short radio link ID may be additionally assigned using at least one of: a) the network element providing the short radio link ID to the user equipment, b) the user equipment, and c) a predetermined algorithm.

Further according to the fourth aspect of the invention, the short radio link ID may be additionally assigned if it is determined by the user equipment or by the network element that the user equipment transmits and receives transport blocks with a regularity corresponding to a predetermined criterion.

Still further according to the fourth aspect of the invention, the user equipment may be configured to allocate the resources related to the user equipment using the short radio link ID in a pattern of subframes during which the short RLID is valid and using the radio link ID for subframes not included in the pattern of subframes, wherein the pattern of subframes during which the further short RLID is valid for the user equipment is further assigned for the user equipment. Further, the short radio link ID may be further assigned using at least one of: a) the network element providing the short radio link ID to the user equipment, b) the user equipment, and c) a predetermined algorithm.

According further to the fourth aspect of the invention, the network element may be a Node B or a radio network controller and the network element and the user equipment may be configured for wireless communications.

According to a fifth aspect of the invention, a network element, comprises: an RLID assigning block, for assigning a radio link ID for a user equipment when the user equipment enters an active state and for assigning a short radio link ID for the user equipment when the user is in the active state, wherein the short radio link ID comprises a smaller number of digital bits than the radio link ID, and wherein the user equipment can allocate resources related to the user equipment using the short radio link ID.

According further to the fifth aspect of the invention, a pattern of subframes during which the short RLID is valid for the user equipment may be further assigned to the user equipment by the an RLID assigning block if it is determined that the user equipment transmits and receives transport blocks with a regularity corresponding to a predetermined criterion such that the user equipment can allocate the resources related to the user equipment using the short radio link ID in the pattern of subframes during which the short RLID is valid and using the radio link ID for subframes not included in the pattern of subframes. Further, the network element may further comprise: an uplink/downlink activity block, for determining whether the user equipment transmits and receives transport blocks with the regularity corresponding to the predetermined criterion.

Further according to the fifth aspect of the invention, the short radio link ID may be further assigned by the network element and provided to the user equipment.

According to a sixth aspect of the invention, a user equipment, comprises: allocating means, for determining allocated resources related to the user equipment in an active mode using a short radio link ID additionally assigned to the user equipment during the active mode, wherein the short radio link ID comprises a smaller number of digital bits than a radio link ID assigned to the user equipment when the user equipment entered the active mode.

According further to the sixth aspect of the invention, the allocating means may be configured to additionally assign the short radio link ID.

Further according to the sixth aspect of the invention, the user equipment may further comprise: means for receiving and transmitting, responsive to a downlink signal, for providing an uplink signal; and activity means, responsive to the uplink and downlink signals, for determining if the user equipment transmits and receives transport blocks with a regularity corresponding to a predetermined criterion, wherein the additionally assigning of the short radio link ID is performed if it is determined that the user equipment transmits and receives transport blocks with the regularity corresponding to the predetermined criterion.

BRIEF DESCRIPTION OF THE DRAWINGS

For a better understanding of the nature and objects of the present invention, reference is made to the following detailed description taken in conjunction with the following drawings, in which.

MODES FOR CARRYING OUT THE INVENTION

Figure 1:
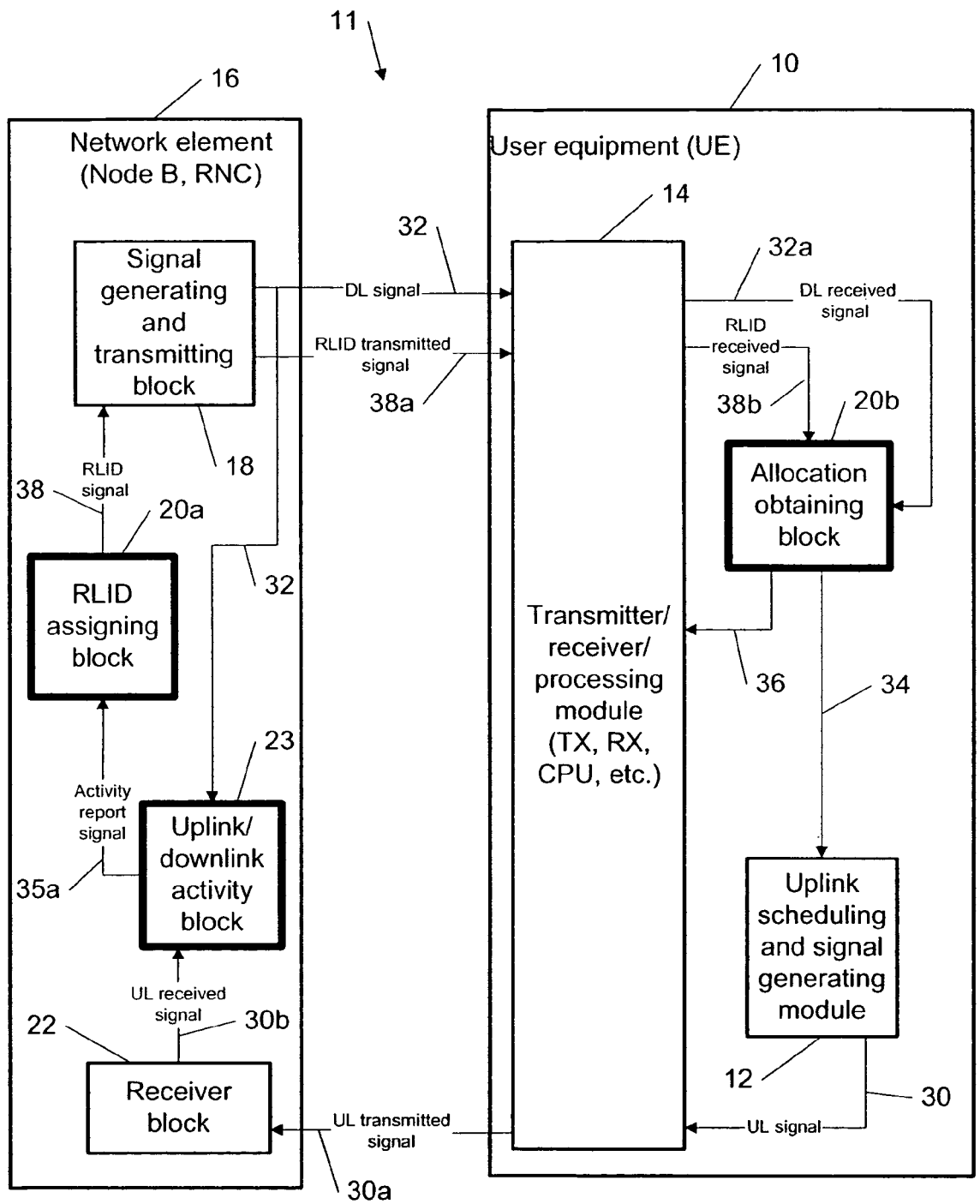
FIG. 1 is a block diagram of a mobile communication system for varying a length of a radio link ID (RLID) of a user equipment for resource allocation, according to an embodiment of the present invention.

A new method, system, apparatus and software product are presented for varying a length of a radio link ID (RLID) of a user equipment for resource allocation in mobile communication systems. This allows the system to employ shorter RLID lengths than is necessary if all user equipments (UEs)

in the active mode are uniquely identified simultaneously, thus providing considerable savings in the signaling resource on the physical layer. The user equipment can be a wireless device, a portable device, a mobile communication device, a mobile phone, etc. It is noted that for the purpose of the present invention, the term "RLID" can be interpreted broadly; other equivalent terms which may be used instead of RLID may include but are not limited to: a user equipment ID (UEID), a cell radio network temporary identifier (C-RNTI), etc.

A user equipment (UE) registered in a cell (e.g., a node B), when entered into an active mode, has an RLID (also called "an original RLID" throughout) assigned to it, wherein the RLID uniquely identifies it from a number of other UEs that also are active in this area of the network. All the traffic to the UE is assigned with this RLID, which the UE continues to use until it releases the active mode. The RLID may be assigned by the network (e.g., by a network element such as a radio network controller, node B, etc.), or it may be derived by some predetermined procedure, e.g., known to both the network and the user equipment. However, all the RLIDs for the active mode UEs have to be unique.

According to an embodiment of the present invention, when the user equipment is in the active mode transmitting or receiving a service that has a service profile with a regularity corresponding to a predetermined criterion (thus permitting reasonably regular arrival/transmission time of transport blocks), the user equipment can be additionally assigned a short RLID with a smaller number of bits than the original RLID by the network element or by the user equipment and/or using a predetermined algorithm, e.g., known to both the network and the user equipment. For example, VoIP (voice over IP) has a packet every 20 ms and this type of periodic behavior (i.e., the predetermined criterion) is suitable for using the short RLID. Thus, the UE can have both the original RLID and the short RLID. Moreover, according to another embodiment of the present invention, the UE can be also further assigned a pattern of subframes during which this short RLID is valid. During these subframes the UE detects the short RLID in order to find out whether the UE is allocated L1 (physical layer) resources in the DL and/or in the UL. For subframes not included in this pattern, the UE can detect the active mode RLID to see whether L1 resources are allocated to it. When the service for which the short RLID is allocated is finished, the UE can return to detect the active mode RLID in all subframes it is reading.

A predetermined algorithm for assigning a short RLID can be illustrated as follows. An example of using a DRX/DTX (discontinuous reception/discontinuous transmission) in the system is considered. The DRX/DTX are defined by the period N (SFN modulo N), and offset M (M=0, 1, . . . , N-1), wherein SFN is a system frame number. Therefore, the requirement from the addressing space point of view is that the addressing space of the set of (N, M, short RLID) should be comparable to that of the original RLID. Assuming that a 20 millisecond interval VoIP (voice over IP) packet over 0.5 ms subframe is used, N=40 is applied. Thus different UEs can have different M from 0 to 39 and the short RLID can be used for the UEs with the same N and M to be distinguished correctly. For example, M can be chosen randomly such that different UEs do not overlap. Note that since the RLID is still available even if the short RLID is assigned, the retransmission, which does not really fit in the (N, M) sub-frame, can be transmitted using the RLID.

FIG. 1 is an example among others of a block diagram of a mobile communication system 11 for varying a length of the radio link ID (RLID) of the user equipment (UE) 10 for resource allocation, according to an embodiment of the present invention.

In the example of FIG. 1, the UE 10 comprises an uplink signal generating module 12, a transmitter/receiver/processing module 14 and an allocation obtaining block 20b. The user equipment 10 can be a wireless device, a portable device, a mobile communication device, a mobile phone, etc. In the example of FIG. 1, a network element 16 (e.g., a node B or a radio network controller, RNC) can comprise a signal generating and transmitter block 18, an RLID assigning block 20a, a receiver block 22 and optionally an uplink/downlink activity block 23.

According to an embodiment of the present invention, the network, e.g., the RLID assigning block 20a can assign/additionally assign the RLID and the short RLID, respectively, in the active mode for the UE 10, as described above, by providing an RLID signal 38 and forwarding using signals 38a and 38b to the allocation obtaining block 20b. The block 20b can determine (obtain) allocated resources (e.g., allocated by the network) related to the user equipment 10 in the UL and/or DL using the RLID and/or the short RLID during said active mode using a DL received signal 32a (generated from the DL signal 32) and providing information on the resources allocated in the UL to the uplink scheduling and signal generating module 12 using a signal 34, and information on the resources allocated in the DL to the block 14 using a signal 36. Note, that the DL signal 32 can comprise both control and data information.

According to the present invention, the modules 12, 14, 20b or 20a can be implemented as a software, a hardware block or a combination thereof. Furthermore, each of the blocks 12, 14, 20a or 20b can be implemented as a separate block or can be combined with any other standard block of the user equipment 10 or the network element 16, or it can be split into several blocks according to their functionality. The transmitter/receiver/processing block 14 can be implemented in a plurality of ways and typically can include a transmitter, a receiver, a CPU (central processing unit), etc. The module 14 can provide an effective communication of the module 12 with the network element 16. All or selected modules of the user equipment 10 can be implemented using an integrated circuit, and all or selected blocks and/or modules of the network element 16 can be implemented using an integrated circuit as well.

The module 12 provides a UL signal 30 (note, that the UL signal 30 can comprise both the control and data information), according to embodiments of the present invention, which is then forwarded (as a signal 30a) to the receiver block 22 of the network element 16 and further (optionally) to the uplink/downlink activity block 23. According to an embodiment of the present invention, the block 23 (monitoring both the UL received signal 30b and the DL signal 32) can be used for determining whether the UE 10 transmits and receives the transport blocks with the regularity corresponding to the predetermined criterion, thus providing the activity report signal 35a to the block 20a to additionally assign the short RLID. The additionally assigning of the short RLID by the block 20a is performed only if the predetermined criterion is met. Moreover, the block 20a can further assign, if said predetermined criterion is met, the pattern of subframes during which the short RLID is valid for the user equipment 10. Block 23 can be identified with a radio resource control (RRC) layer and the determining whether the UE 10 transmits and receives the transport blocks with the regularity corresponding to the predetermined criterion can be based, e.g., on the DRX/DTX scheme applied to the UE 10.

It is noted that the network element 16, for the purposes of understanding of various embodiments of the present invention, can be broadly interpreted such that the network element 16 can comprise features attributed to both the Node B and the radio network controller (RNC). Specifically, the module 20a can be located in the RNC (then the signaling from the RNC is forwarded to the user equipment by the Node B) or in the Node B, whereas the block 22 is located in the Node B.

Figure 2:
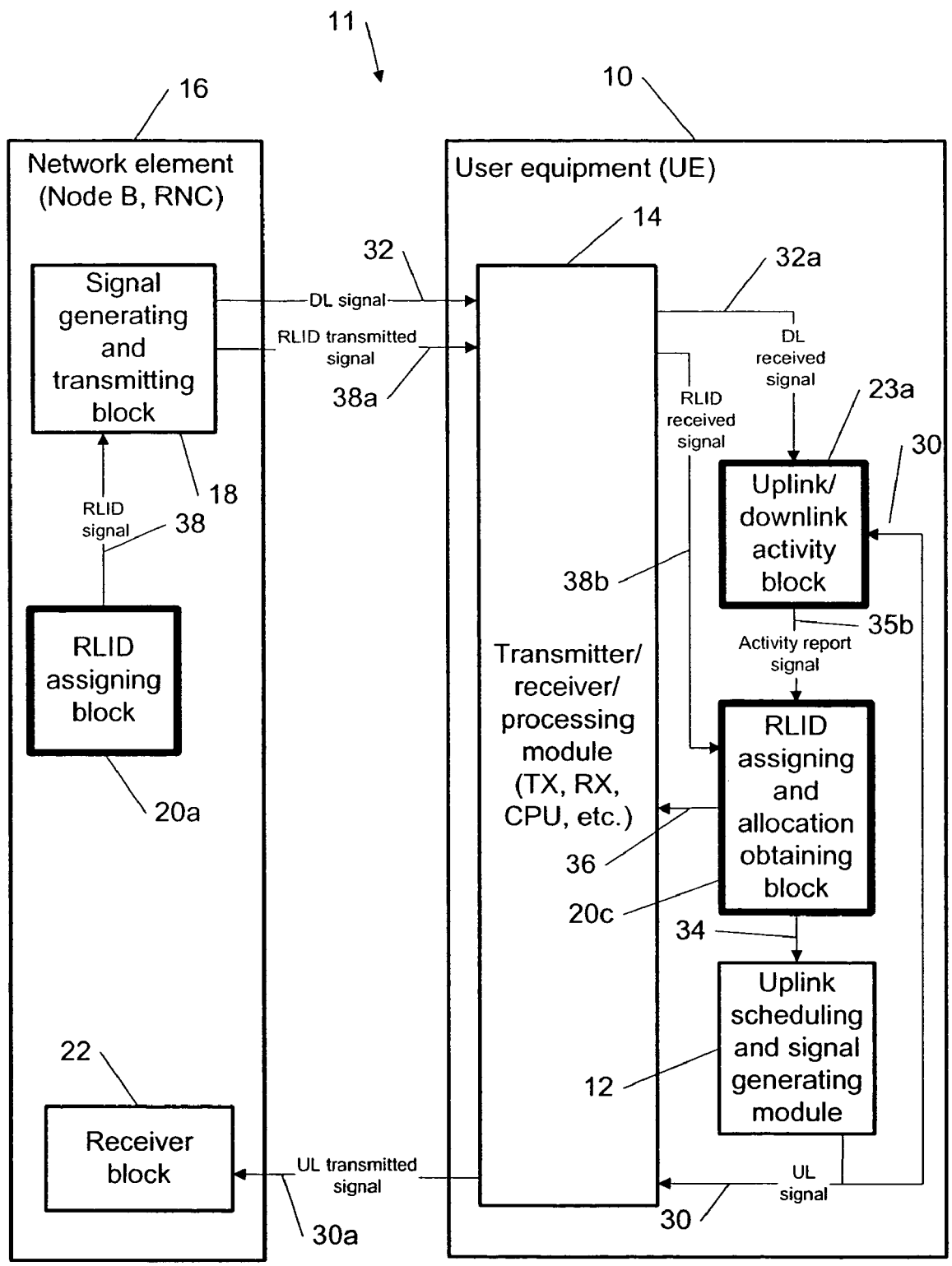
FIG. 2 is a block diagram of an alternative implementation of a mobile communication system for varying a length of a radio link ID (RLID) of a user equipment for resource allocation, according to an embodiment of the present invention.

There are many possible implementation scenarios of a basic concept shown in FIG. 1. FIG. 2 shows an example among others of a block diagram of an alternative implementation of the mobile communication system 11 for varying the length of the RLID of the UE 10 for resource allocation, according to an embodiment of the present invention.

The block diagram of FIG. 2 is similar to the one of FIG. 1 with the exception that:

a) the function of determining whether the UE 10 transmits and receives the transport blocks with the regularity corresponding to the predetermined criterion is performed by the uplink/downlink activity block 23a of the UE 10 and not by the block 23 of the network element 16 as shown in FIG. 1; then the block 23a (monitoring both the UL signal 30 and the DL received signal 32a) can provide the activity report signal 35b to the block 20c to additionally assign the short RLID; and b) the assigning/ additionally assigning the RLID and the short RLID in the active mode for the UE 10 can be performed using the predetermined algorithm known to both the UE 10 and the network element 16.

For example, both assigning/additionally assigning the RLID and the short RLID in the active mode for the UE 10 can be performed by the RLID assigning and allocation obtaining block 23a in the UE 10 by using the predetermined procedure/ algorithm without any signaling from the network element 16. Alternatively, the RLID assigning block 20a can assign (using signals 38, 38a, and 38b) the original RLID to the UE 10 but the short RLID can be assigned based on the activity report signal 35b to the block 20c using the predetermined algorithm.

Figure 3:
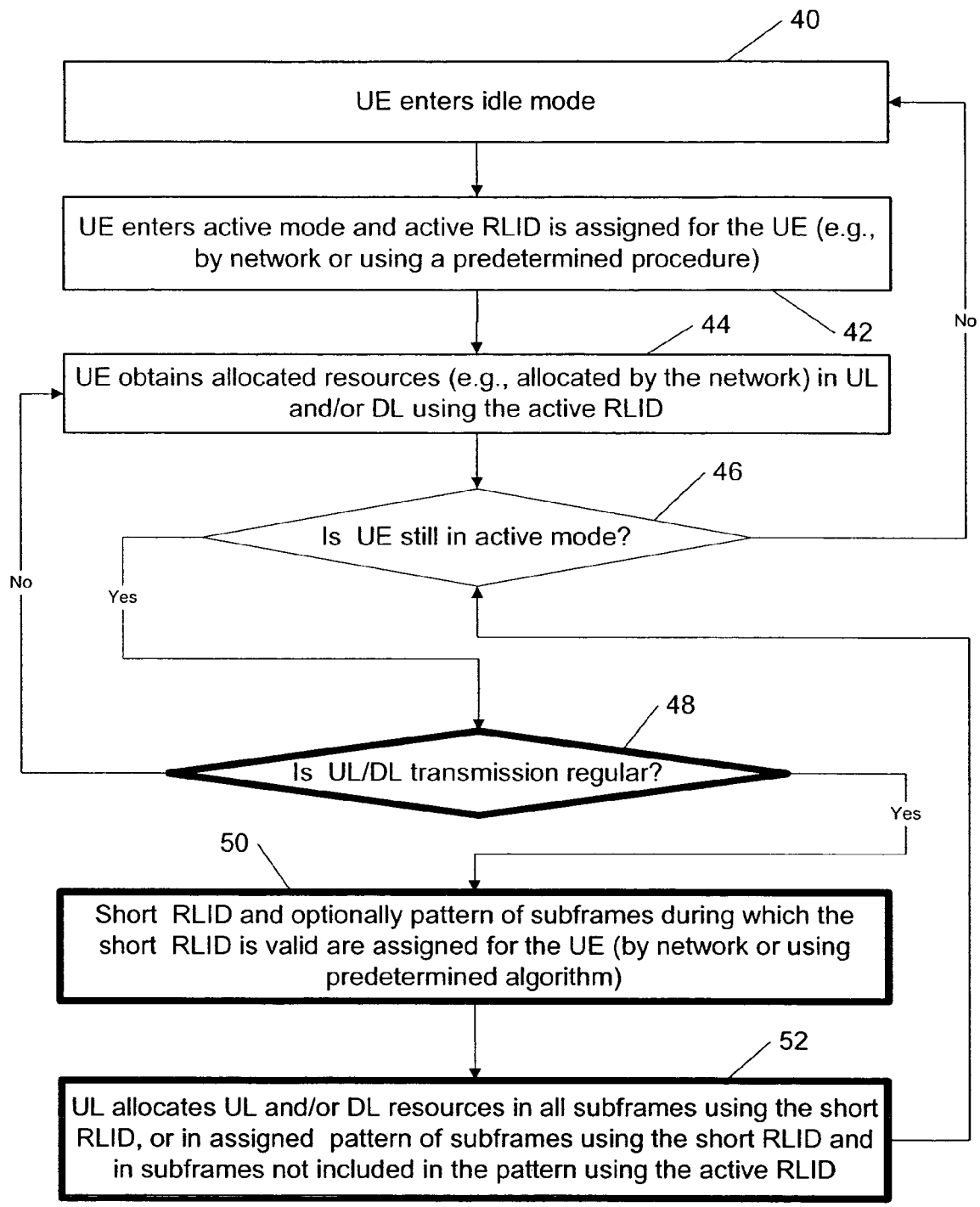
FIG. 3 is a flow chart demonstrating varying a length of a radio link ID (RLID) of a user equipment for resource allocation, according to an embodiment of the present invention.

FIG. 3 is a flow chart demonstrating varying the length of the RLID for the UE 10 of resource allocation, according to an embodiment of the present invention.

The flow chart of FIG. 3 only represents one possible scenario among others. The order of steps shown in FIG. 3 is not absolutely required, so generally, the various steps can be performed out of order. In a method according to the first embodiment of the present invention, in a first step 40, the UE 10 enters the idle mode. In a next step 42, the UE 10 enters the active mode and the RLID (or the original RLID) is assigned for the UE 10, e.g., by the network (for example, by the network element 16) or using the predetermined procedure, as described above. In a next step 44, the UE 10 obtained allocated resources (e.g., allocated by the network element 16) in the UL and/or the DL using the original RLID.

In a next step 46, it is ascertained whether the UE 10 is still in the active mode. If that is not the case, the process goes back to step 40. However, if it is determined that the UE 10 is still in the active mode, in a next step 48 it is ascertained whether the UL/DL transmission is regular, i.e., whether the user equipment 10 transmits and receives transport blocks with a regularity corresponding to the predetermined criterion. If that is not the case, the process goes back to step 44. However, if it is determined that the UL/DL transmission is regular, in a next step 50, the short RLID and possibly the pattern of subframes during which the short RLID is valid are assigned for the UE 10 (e.g., by the network or using the predetermined algorithm). It is noted that step 48 can be performed with a predetermined regularity and not for every subframe. Finally, in a next step 52, the UE 10 allocates the UL and/or DL resources in all subframes using the short RLID, or in the assigned pattern of the subframes using the short RLID and in the subframes not included in the pattern using the original RLID.

As explained above, the invention provides both a method and corresponding equipment consisting of various modules providing the functionality for performing the steps of the method. The modules may be implemented as hardware, or may be implemented as software or firmware for execution by a computer processor. In particular, in the case of firmware or software, the invention can be provided as a computer program product including a computer readable storage structure embodying computer program code (i.e., the software or firmware) thereon for execution by the computer processor.

Also, it is noted that various embodiments of the present invention recited herein can be used separately, combined or selectively combined for specific applications.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method, comprising:
   assigning a radio link identifier responsive to a user equipment entering an active mode;
   assigning a short radio link identifier to said user equipment, wherein said short radio link identifier comprises a smaller number of digital bits than said radio link identifier;
   allocating resources related to said user equipment using said short radio link identifier for a first portion of subframes during said active mode; and
   allocating resources related to said user equipment using said radio link identifier for a second portion of subframes during said active mode.

2. The method of claim 1, wherein said assigning said short radio link identifier is performed using at least one of a network element providing said short radio link identifier to said user equipment, said user equipment, and a predetermined algorithm.

3. The method of claim 1, further comprising:
   determining if said user equipment transmits and receives transport blocks with a regularity corresponding to a predetermined criterion, wherein said assigning said short radio link identifier is performed only if said predetermined criterion is met.

4. The method of claim 3, wherein said determining is performed by a network element or by said user equipment.

5. The method of claim 1, further comprising:
   assigning, if a predetermined criterion is met, a pattern of subframes during which said short radio link identifier is valid for said user equipment.

6. The method of claim 5, wherein said first portion of subframes comprises said pattern of subframes during which said short radio link identifier is valid and said second portion of subframes comprises subframes not included in said pattern of subframes.

7. The method of claim 5, wherein said assigning said pattern of subframes is performed using at least one of a network element providing said short radio link identifier to said user equipment, said user equipment, and a predetermined algorithm.

8. The method of claim 1, wherein said allocated resources related to said user equipment are in an uplink, in a downlink or in combination thereof.

9. The method of claim 1, wherein said network element is a Node B or a radio network controller and said network element and said user equipment are configured for wireless communications.

10. An article of manufacture including a non-transitory computer-readable medium having instruction stored thereon that, if executed by a computing device, cause the computing device to perform operations comprising:
assigning a radio link identifier responsive to a user equipment entering an active mode;
assigning a short radio link identifier to said user equipment, wherein said short radio link identifier comprises a smaller number of digital bits than said radio link identifier;
allocating resources related to said user equipment using said short radio link identifier for a first portion of subframes during said active mode; and
allocating resources related to said user equipment using said radio link identifier for a second portion of subframes during said active mode.

11. A user equipment, comprising:
an allocation obtaining block configured to:
determine allocated resources related to said user equipment in an active mode using a short radio link identifier assigned to the user equipment during said active mode for a first portion of subframes; and
determine allocated resources related to said user equipment in said active mode using a radio link identifier assigned to said user equipment during said active mode for a second portion of frames,
wherein said short radio link identifier comprises a smaller number of digital bits than said radio link identifier.

12. The user equipment of claim 11, wherein said allocation obtaining block is further configured to assign said short radio link identifier.

13. The user equipment of claim 11, wherein said short radio link identifier is assigned using at least one of said allocation obtaining block, a network element, and a predetermined algorithm.

14. The user equipment of claim 11, further comprising:
a receiving/transmitting/processing module configured to provide an uplink signal responsive to a downlink signal; and
an uplink/downlink activity block configured to determine, responsive to said uplink and downlink signals, if said user equipment transmits and receives transport blocks with a regularity corresponding to a predetermined criterion,
wherein said short radio link identifier is assigned to said user equipment if it is determined that said user equipment transmits and receives transport blocks with the regularity corresponding to said predetermined criterion.

15. The user equipment of claim 11, further comprising:
an uplink scheduling and signal generating module configured to schedule and provide an uplink signal to a network element using said allocated resources.

16. The user equipment of claim 11, wherein said user equipment is assigned a pattern of subframes wherein said short radio link identifier may be used and wherein said first portion of subframes comprises said pattern of subframes during which said short radio link identifier is valid and said second portion of subframes comprises subframes not included in said pattern of subframes.

17. The user equipment of claim 16, wherein said allocation obtaining block is further configured to assign said short radio link identifier.

18. The user equipment of claim 16, wherein said short radio link identifier is assigned using at least one of said allocation obtaining block, a network element, and a predetermined algorithm.

19. The user equipment of claim 11, wherein said allocated resources related to said user equipment are in an uplink, in a downlink or in combination thereof.

20. The user equipment of claim 11, wherein an integrated circuit comprises all or selected blocks or modules of said user equipment.

21. A system, comprising:
a network element configured to provide a downlink signal; and
a user equipment assigned a radio link identifier and a short radio link identifier for use in an active mode, wherein said user equipment, responsive to said downlink signal, is configured to allocate resources related to said user equipment when in said active mode using said short radio link identifier for a first portion of subframes and using said radio link identifier for a second portion of subframes, wherein
said short radio link identifier comprises a smaller number of digital bits than said radio link identifier.

22. The system of claim 21, wherein said short radio link identifier is assigned using at least one of said network element, said user equipment, and a predetermined algorithm.

23. The system of claim 21, wherein said short radio link identifier is assigned if it is determined by said user equipment or by said network element that said user equipment transmits and receives transport blocks with a regularity corresponding to a predetermined criterion.

24. The system of claim 21, wherein said user equipment is assigned a pattern of subframes wherein said short radio link identifier may be used and wherein said first portion of subframes comprises said pattern of subframes during which said short radio link identifier is valid.

25. The system of claim 24, wherein said second portion of subframes comprises subframes not included in said pattern of subframes.

26. The system of claim 21, wherein said network element is a Node B or a radio network controller and said network element and said user equipment are configured for wireless communications.

27. A network element, comprising:
a radio link identifier assigning block, configured to assign a radio link identifier and a short radio link identifier to a user equipment in an active state,
wherein said short radio link identifier comprises a smaller number of digital bits than said radio link identifier, and
wherein said user equipment is configured to allocate resources related to said user equipment using said short radio link identifier for a first portion of subframes and using said radio link identifier for a second portion of subframes.

28. The network element of claim 27, wherein said radio link identifier assigning block is further configured to assign a pattern of subframes during which said short radio link identifier may be used to said user equipment if it is determined that said user equipment transmits and receives transport blocks with a regularity corresponding to a predetermined criterion.

29. The network element of claim 28, further comprising:
an uplink/downlink activity block, configured to determine whether said user equipment transmits and receives transport blocks with said regularity corresponding to said predetermined criterion.

30. The network element of claim 28, wherein said short radio link identifier is assigned by the network element and provided to said user equipment.

31. A user equipment, comprising:
allocating means for:
   determining allocated resources related to said user equipment in an active mode using a short radio link identifier assigned to the user equipment during said active mode for a first portion of subframes; and
   determining allocated resources related to said user equipment in said active mode using a radio link identifier assigned to said user equipment during said active mode for a second portion of frames,
   wherein said short radio link identifier comprises a smaller number of digital bits than said radio link identifier.

32. The user equipment of claim 31, wherein said allocating means is further configured to additionally assign said short radio link identifier.

33. The user equipment of claim 31, further comprising:
means for providing an uplink signal responsive to a downlink signal; and
activity means, responsive to said uplink and downlink signals, for determining if said user equipment transmits and receives transport blocks with a regularity corresponding to a predetermined criterion,
wherein said short radio link identifier is assigned to said user equipment if it is determined that said user equipment transmits and receives transport blocks with the regularity corresponding to said predetermined criterion.

34. A network element, comprising:
assigning means for assigning a radio link identifier and a short radio link identifier to a user equipment responsive to said user equipment entering an active state,
wherein said short radio link identifier comprises a smaller number of digital bits than said radio link identifier, and
wherein said user equipment allocates resources related to said user equipment during said active state using said short radio link identifier for a first portion of subframes and using said radio link identifier for a second portion of subframes.

35. A method, comprising:
assigning a radio link identifier to a user equipment for use in an active mode;
assigning a short radio link identifier to said user equipment, wherein said short radio link identifier comprises a smaller number of digital bits than said radio link identifier;
allocating resources related to said user equipment using said short radio link identifier during said active mode; and
assigning, if a predetermined criterion is met, a pattern of subframes during which said short radio link identifier is valid for said user equipment,
wherein said allocating resources related to said user equipment is performed using said short radio link identifier in said pattern of subframes during which said short radio link identifier is valid and using said radio link identifier for subframes not included in said pattern of subframes.

* * * * *

UNITED STATES PATENT AND TRADEMARK OFFICE
CERTIFICATE OF CORRECTION

| | | |
|---|---|---|
| PATENT NO. | : 7,852,805 B2 | Page 1 of 1 |
| APPLICATION NO. | : 11/590688 | |
| DATED | : December 14, 2010 | |
| INVENTOR(S) | : Kahtava et al. | |

It is certified that error appears in the above-identified patent and that said Letters Patent is hereby corrected as shown below:

Column 11, line 20, in Claim 32, after "configured to" delete "additionally".

Signed and Sealed this
Twelfth Day of July, 2011

David J. Kappos
*Director of the United States Patent and Trademark Office*